A. E. HUMPHREYS.
KITCHEN UTENSIL.
APPLICATION FILED SEPT. 14, 1909.
944,265.
Patented Dec. 28, 1909.
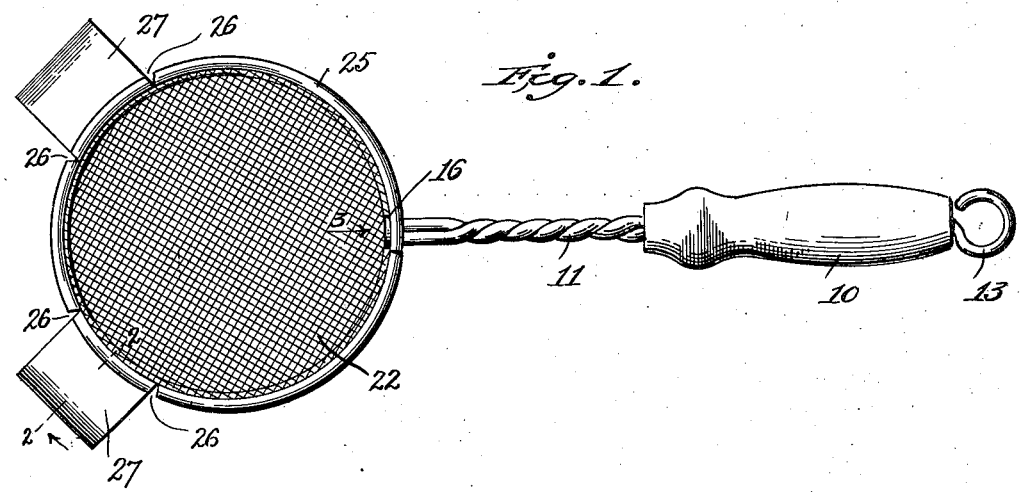
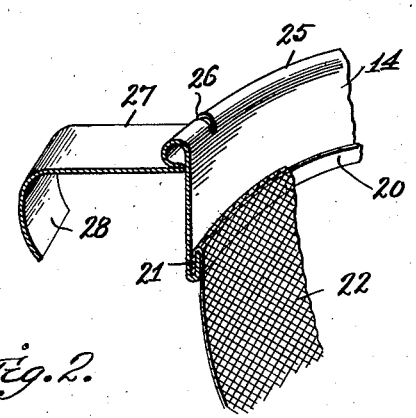
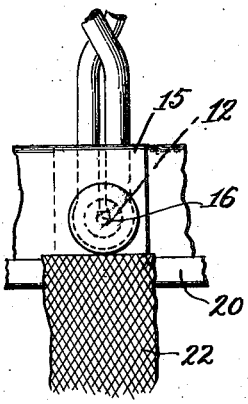
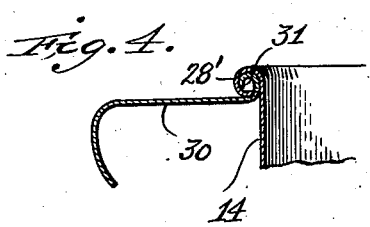
Witnesses:
Inventor
A. E. Humphreys
by Attorneys
Southgate & Southgate

UNITED STATES PATENT OFFICE.

ALBERT E. HUMPHREYS, OF LOWELL, MASSACHUSETTS, ASSIGNOR TO THE WOODS-SHERWOOD COMPANY, OF LOWELL, MASSACHUSETTS, A CORPORATION OF MASSACHUSETTS.

KITCHEN UTENSIL.

944,265.    Specification of Letters Patent.    Patented Dec. 28, 1909.

Application filed September 14, 1909. Serial No. 517,611.

*To all whom it may concern:*

Be it known that I, ALBERT E. HUMPHREYS, a citizen of the United States, residing at Lowell, in the county of Middlesex and State of Massachusetts, have invented a new and useful Kitchen Utensil, of which the following is a specification.

This invention relates to kitchen utensils and is particularly adapted for small strainers, but is capable of general use.

The principal objects of the invention are to provide a construction in which the handle can be made in a simple and inexpensive way and secured to the wire or body of the utensil without solder or the like; to provide a construction whereby the two ends of the rim can be secured together without solder and without any material or operation which would add to the expense of merely securing the handle to the rim at any other point; to provide means whereby the foraminous, or other, bottom can be secured to the rim without the use of solder; and particularly to provide a new, improved, and simplified form of arm projecting from the top of the rim, by making this arm integral with the material of the rim and associating it with a bead thereon in such a way as to allow the bead to have a uniform surface and give strength to the rim itself.

Further objects and advantages of the invention will appear hereinafter.

Reference is to be had to the accompanying drawings in which,

Figure 1 is a plan of a household strainer constructed in accordance with this invention; Fig. 2 is a sectional view of the same on the line 2—2 of Fig. 1; Fig. 3 is a fragmentary inside elevation looking in the direction of the arrow 3 in Fig. 1; and Fig. 4 is a sectional view of a modification.

In the drawings, the grip 10 of the handle is shown as of an ordinary form and it is provided with a shank 11 formed of twisted wire. This shank is formed of a single wire doubled over to form a loop 12 and then twisted until it extends into the grip and is provided with an integral hook 13 on one end.

The body of the utensil is formed of a sheet metal rim 14, the ends of which are looped over as shown at 15. At this point the ends of the rim are secured together by means of a rivet 16 or other similar fastening device extending through the lapped-over ends and also extending through the loop 12 in the handle. In this way no solder is required and a firm joint can be made. This single fastening device not only secures the handle in position but it secures the ends of the rim to each other, thus entirely doing away with one fastening means and one operation for applying it. The rim is shown as provided with an upturned flange 20 extending entirely around the bottom thereof and projecting inwardly. This is for the purpose of receiving a downwardly turned outside flange 21 on the foraminous bottom 22 of the strainer. When these parts are placed in this position, as clearly shown in Fig. 2, the flanges are forced together so that the foraminous bottom is securely held in position and there is no necessity for using solder at this point which greatly economizes in the cost of construction without materially reducing the efficiency of the article. The rim is also shown as having an external circular bead 25 which extends down substantially into contact with the outer edge of the rim all around. This bead is provided with one or more pairs of slits 26 in the top between which an arm 27 extends outwardly from the bottom of the bead. Preferably the bead is brought clear in so that the inner end of this arm is substantially in contact with the outside of the rim which permits of a strong construction and a neat appearance. This arm projects outwardly and preferably has a downward extension 28 at the end. Any desired number of these arms can be employed.

In the form shown in Fig. 4, the arm 30 is made in a separate piece and provided with an upturned inner end 31, so that when the bead 28' is bent down it will curve over the top of the end 31 and securely fasten it in position. In this way some economy is effected in the use of the metal, and the bead can be continuous, as the slits 26 are avoided.

While I have illustrated and described two preferred embodiments of the invention, I am aware that many modifications can be made therein by any person skilled in the art, without departing from the scope of the invention as expressed in the claims. Therefore, I do not wish to be limited to all the details shown and described, but What I do claim is:—

1. As an article of manufacture, a kitchen utensil comprising a handle having a shank formed of twisted wire provided with a downwardly bent loop at the end, a rim of sheet metal having overlapping ends, and a rivet extending through said loop at the bottom thereof and through the overlapped portion of said rim for securing the handle thereto.

2. As an article of manufacture, a kitchen utensil having a sheet metal rim, and a handle extending therefrom, said handle having a shank consisting of twisted wire provided with a loop at the end and secured to said rim by a fastening device extending through the loop and directly through the rim.

3. As an article of manufacture, a kitchen utensil comprising a sheet metal rim having its ends overlapping each other and riveted together, and a bottom supported by said rim.

4. As an article of manufacture, a strainer comprising a sheet metal rim having its ends overlapping and riveted together, and a foraminous bottom, said rim having inwardly upturned flanges at the bottom thereof, and the bottom having a downwardly extending flange at the top inside the flange on the rim, said flanges being pressed together, whereby the parts are firmly united without the use of solder.

5. As an article of manufacture, a kitchen utensil comprising a sheet metal rim, and a foraminous bottom, said rim having inwardly upturned flanges at the bottom thereof, and the bottom having a downwardly extending flange at the top fitting inside the flange on the rim, said flanges being pressed together.

6. As an article of manufacture, a kitchen utensil comprising a sheet metal rim having a rounded bead at the upper edge thereof extending outwardly, and a supporting arm integral with said bead extending outwardly therefrom.

7. As an article of manufacture, a kitchen utensil having a circular sheet metal rim and provided with an integral supporting arm extending outwardly from a point near the top thereof.

8. As an article of manufacture, a kitchen utensil comprising a sheet metal rim, a circular bead at the top thereof extending outwardly, said bead being slit at two separated points, and an integral arm extending outwardly from said bead between the slits, the inner end of said arm being located at the bottom of the bead and in engagement with the outside of the rim.

9. As an article of manufacture, a kitchen utensil having a sheet metal rim provided with an external bead at its upper edge, and an outwardly projecting arm held by the bead.

10. As an article of manufacture, a kitchen utensil having a sheet metal rim provided with an external bead at its upper edge, and an outwardly projecting arm held by the bead, said arm being of sheet metal and having an upwardly turned inner end extending into the bead.

In testimony whereof I have hereunto set my hand, in the presence of two subscribing witnesses.

ALBERT E. HUMPHREYS.

Witnesses:
IRVING A. GREEN,
STANLEY E. QUA.